United States Patent

[11] 3,611,892

[72] Inventors Wolfgang Ort
Stuttgart-Bad;
Michael Reich, Altbach Kreis Eblingen, both of Germany
[21] Appl. No. 771,448
[22] Filed Oct. 29, 1968
[45] Patented Oct. 12, 1971
[73] Assignee Eastman Kodak Company
Rochester, N.Y.
[32] Priority June 26, 1968
[33] Germany
[31] P 17 72 729.6

[54] DEVICE FOR INDICATING UNDEREXPOSURE IN PHOTOGRAPHIC CAMERAS WITH AUTOMATIC EXPOSURE CONTROL
5 Claims, 1 Drawing Fig.

[52] U.S. Cl..................................................... 95/10 C, 95/64 C
[51] Int. Cl....................................................... G03b 7/08, G03b 7/14, G03b 9/06
[50] Field of Search............................................ 95/10 C, 64 R, 64 C

[56] References Cited
UNITED STATES PATENTS
| | | | |
|---|---|---|---|
| 3,106,141 | 10/1963 | Estes............................ | 95/10 C |
| 3,143,047 | 8/1964 | Sherwood..................... | 95/10 C |
| 3,500,731 | 3/1970 | Bresson et al................. | 95/10 C |

*Primary Examiner*—Joseph F. Peters
*Attorneys*—R. W. Hampton and Daniel E. Sragow

ABSTRACT: In a camera of the type having a movable exposure control member for varying an exposure parameter from a maximum to a minimum, and a photoelectric circuit that controls a transducer for selectively stopping the movement of the exposure control member to establish the exposure parameter in accordance with the level of scene illumination, a low-light indicator is provided including means associated with a movable shutter-release member for moving the exposure control member from its maximum exposure parameter position to its minimum exposure parameter position, and an electric signal means coupled with the photoelectric circuit for actuation immediately upon movement of the release member, when the scene illumination is below a predetermined level.

PATENTED OCT 12 1971
3,611,892
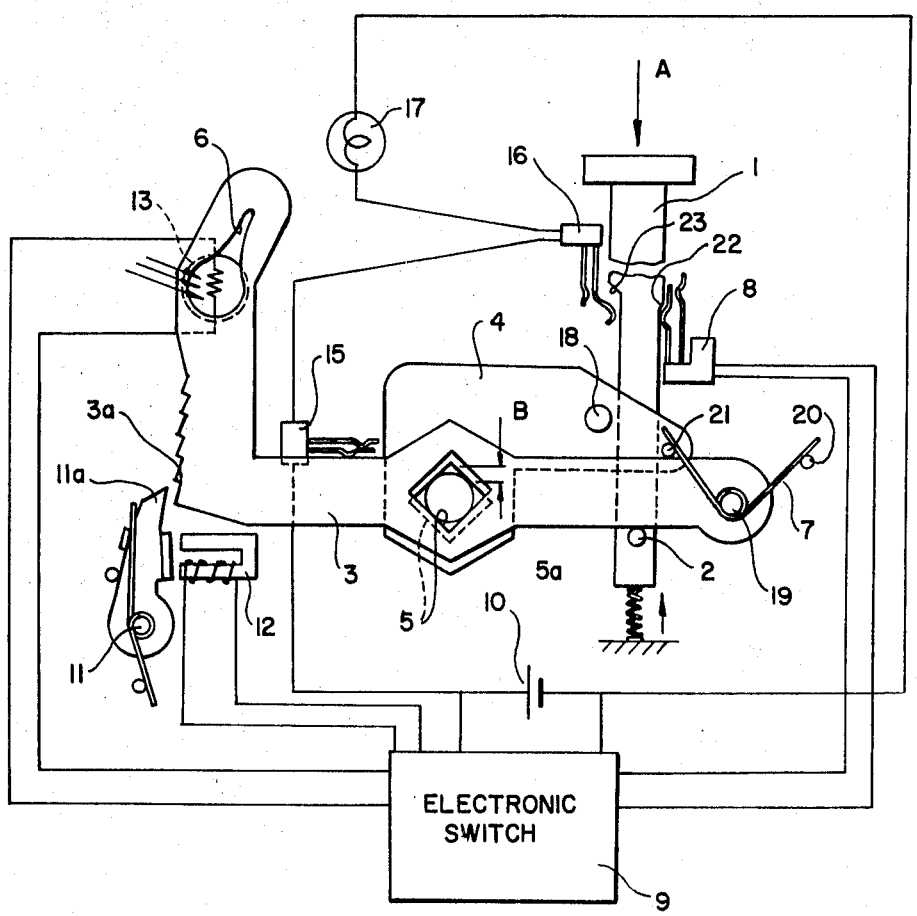
WOLFGANG ORT
MICHAEL REICH
INVENTORS
BY *Daniel E. Sragow*
*Robert W. Hampton*
ATTORNEYS

DEVICE FOR INDICATING UNDEREXPOSURE IN PHOTOGRAPHIC CAMERAS WITH AUTOMATIC EXPOSURE CONTROL

BACKGROUND OF THE INVENTION

1. Field of the Invention

The invention relates to a device for indicating underexposure in the camera having automatic exposure control, and more particularly in a camera having an electronic diaphragm exposure control. A slotted diaphragm is arranged in front of a photoresistor and is mechanically coupled with the lens diaphragm for synchronous movement therewith. An amplifier that is controlled by the photoresistor controls an electromagnetic-mechanical locking device in such a manner that the locking device responds when, in the course of diaphragm movement, a certain threshold value is reached, thus determining the optimum diaphragm aperture for shutter action in accordance with object brightness.

2. Description of the Prior Art

Known cameras with electronic diaphragm controls are provided with opening diaphragms; i.e., a diaphragm opening movement is initiated upon actuation of the shutter release and is stopped from further opening by a latch operated by a photoresistor, a threshold electronic system, and an electromagnet, in dependence on the prevailing scene brightness. In these cameras an underexposure indication of a scene illumination level which is too low for acceptable photography can be rendered visible only a short time before shutter release. This constitutes a considerable disadvantage because the shutter is released if the camera operator continues only for a short moment to move the release member any further; hence the exposure is performed in spite of the low-light signal.

SUMMARY OF THE INVENTION

It is therefore an object of the invention to warn the user of an underexposure in case of insufficient light by providing a visible signal in the initial part of movement of the shutter release member instead of in the latter part. Another object of the invention is to make it possible to check the battery and the operation of the electronic system without the necessity of incorporating a complicated structure.

These and objects of the invention have been accomplished by providing a device for indicating underexposure in a photographic camera in which the circuit for the underexposure indication and the circuit for the electronic diaphragm control are separate and in which the circuit for the underexposure indication includes two switches arranged in series which are actuated in such an order that in case of insufficient scene brightness the danger of underexposure is indicated during the lost motion preceding shutter release, after the electronic system has been connected and the diaphragms have reached their maximum aperture; i.e., before they start their closing movement.

BRIEF DESCRIPTION OF THE DRAWING

The operation of an embodiment of the device is described below with reference to the accompanying drawing in which the sole figure shows a partially diagrammatic, partially schematic view of an exposure control and low-light indicator according to the invention.

DESCRIPTION OF A PREFERRED EMBODIMENT

When release member 1 is depressed in the direction of arrow A, restoring rivet 2, which is mounted on member 1, releases diaphragm blade 3 which pivots on pivot 19, and diaphragm blade 4, which pivots on rivet 18, for their running down movement, so that lens diaphragm 5 and photoresistor diaphragm 6, which is arranged on an arm of diaphragm blade 3, close under the bias of leg spring 7 of which one end abuts fixed pin 20 and of which the other end abuts pin 21 which is mounted on diaphragm blade 4, and which in turn abuts blade 3. At the beginning of the release movement, switch 8 is closed by cam 22, whereby an electronic switch 9 is connected to battery 10. The closing of switch 8 is performed during the lost motion along path B. The electronic switch 9 is designed in such a manner that the circuit is triggered when the photoresistor 13 has reached a certain resistance value thus energizing electromagnetic 12 so as to attract armature 11. Thus the diaphragm movement is immediately stopped because toothed portion 3a of diaphragm blade 3 engages the appropriately shaped edge 11a of armature 11.

During the entire lost motion along path B, switch 15 remains closed. However, switch 16 which is actuated by cam 23 and which is connected in series with switch 15 is not closed until diaphragm blades 3 and 4 have traversed path B. Consequently, the chronological sequence of switch operation cooperates with the electronic system and the diaphragm blades 3 and 4 controlled thereby.

The cycle of operation is effected as follows: If the object brightness is not sufficient for a correct exposure, the resistance of the photoresistor is so high that the circuit is triggered during the lost motion along path B, immediately after switch 8 has been closed, thus energizing electromagnet 12. Thus armature 11 is attracted and the diaphragm movement stopped. In this case switch 15 remains closed. Its contact springs are adjusted in such a manner that switch 15 is able to open only after diaphragm blade 3 has performed a movement corresponding to lost motion B. At the end of lost motion B preceding actuation, switch 16 is closed and lamp 17 starts to glow. If lamp 17 is visible in the camera viewfinder, the camera operator is warned by a signal in the viewfinder and is able to stop pressing release member 1 before the shutter is released. As soon as he stops depressing release member 1, switch 8 is open again, thereby deenergizing the electronic system 9 and electromagnet 12. Lamp 17 is extinguished because switch 16 reopens, and diaphragm blades 3 and 4 can return into their initial position because armature 11 is released again.

It is important for proper functioning of the entire device that the largest photoresistor aperture value exceeds the maximum aperture of the lens by about one $f$ stop. The maximum aperture of the lens is slightly smaller than the maximum diaphragm aperture 5 formed by the two diaphragm blades 3 and 4 before initiation of exposure. Thus the effective relative diaphragm aperture remains constant during the lost motion B of release member 1 and diaphragm blades 3 and 4. This is necessary to avoid a low-light warning signal when the object brightness is just sufficient for proper exposure when using a particular shutter speed with a film of a given sensitivity.

If, however, at the moment of release the prevailing scene brightness suffices for making a correct exposure, diaphragm blade 3 and 4 move at least to such an extent that the complete path of lost motion B is traversed. As soon as diaphragm blade 3 passes beyond said path B, the contact arms of switch 15 are separated by the movement of diaphragm blade 3, whereby switch 15 is opened. Lamp 17 does not glow because its circuit remains open even if switch 16 is closed by release member 1.

The device described above makes it possible to control the operation and to test the battery in the most simple manner. For this purpose the light admitting aperture associated with photoresistor 13 is obstructed, e.g. with a finger, so that the electronic system is triggered upon actuation of the release member during the lost motion along path B. Then switch 15 does not open because the movement of diaphragm blade 3 is stopped, as described above. Lamp 17 therefore glows. The signal indicates to the camera operator that the diaphragm control device, as well as the indication circuit and the battery supplying current to both, are in proper working condition.

The invention has been described in detail with particular reference to a preferred embodiment thereof, but it will be understood that variations and modifications can be effected within the spirit and scope of the invention.

We claim:

1. In a camera having diaphragm means for establishing an exposure aperture including a member movable along a path to vary the size of the exposure aperture from a maximum size to a minimum size, and having an actuatable electromechanical transducer for selectively stopping the movement of the diaphragm member along its path to establish the exposure aperture size, a low-light indicator comprising:
   a. actuatable drive means for moving the diaphragm member from its maximum aperture position to its minimum aperture position;
   b. photoresponsive means adapted to receive illumination from an object scene and having an electric parameter which varies as a function of the level of scene illumination incident thereon;
   c. electric circuit means operatively connected to said photoresponsive means and to the transducer for controlling actuation of the transducer in accordance with said electric parameter to establish an exposure aperture size in accordance with the level of scene illumination incident on said photoresponsive means;
   d. means movable for variably attenuating the scene illumination incident on said photoresponsive means;
   e. means coupling said attenuating means with said diaphragm member for simultaneous movement therewith;
   f. electrically actuatable signal means connected to said circuit means and to said photoresponsive means; and
   g. means for actuating said signal means in response to actuation of said drive means, when the illumination incident on said photoresponsive means is below a predetermined level.

2. In an automatic exposure control apparatus having an exposure control member movable along a path to vary an exposure parameter from a maximum to a minimum, and having an actuatable electromechanical transducer for selectively stopping the movement of said member along its path to establish the exposure parameter, a light-low indicator comprising;
   a. actuatable drive means for moving said exposure control member from its maximum exposure parameter position to its minimum exposure parameter position;
   b. a photoelectric cell adapted to be exposed to scene illumination;
   c. means movable for variably attenuating the scene illumination incident on said photocell;
   d. means coupling said attenuating means with said exposure control member for substantially simultaneous movement therewith;
   e. electric circuit means coupled to said photoelectric cell and to said transducer for actuating said transducer to stop the movement of the control member when the illumination of said photocell is attenuated to a predetermined level;
   f. electrically actuatable signal means coupled to said circuit means and to said photoelectric cell, and
   g. means for actuating said signal means in response to actuation of said drive means, when the illumination incident on said photocell is below said predetermined level.

3. A low scene-light indicator for a photographic camera comprising:
   a. electrically actuatable signal means;
   b. first and second switch means electrically connected in series with said signal means for controlling actuation thereof;
   c. actuatable means for initiating an exposure interval, said exposure-initiating means being associated with said first switch means for holding said first switch means normally open, and for closing said first switch means upon actuation to initiate an exposure interval; and
   d. an exposure control member movable to vary an exposure parameter, said member being associated with said second switch means for holding said second switch means normally closed and for opening said second switch in response to movement of said exposure control member.

4. An indicator as in claim 3 wherein said signal means is a lamp.

5. In a photographic camera a low-light level indicator for indicating when scene illumination is below a predetermined level, said indicator comprising:
   a. an exposure control member movable along a path to vary an exposure parameter from a maximum to a minimum;
   b. an exposure release member movable from a rest position to a release position to initiate operation of the camera;
   c. means responsive to movement of said release member from its rest position to its release position for moving said control member from its maximum exposure parameter position to its minimum exposure position; and
   d. signal means actuatable in response to initial movement of said release member from its rest position for indicating if the light level is below the predetermined value.